United States Patent Office 3,840,667
Patented Oct. 8, 1974

3,840,667
OXYGEN-CONTAINING ATMOSPHERES
Clayton M. Huggett, Burke, Va., assignor to Atlantic Research Corporation
No Drawing. Continuation of application Ser. No. 744,314, July 12, 1968. This application Oct. 9, 1970, Ser. No. 79,646
Int. Cl. A61k 13/00
U.S. Cl. 424—366
20 Claims

ABSTRACT OF THE DISCLOSURE

Disclosed are oxygen-containing atmospheres which will not support combustion but which will sustain mammalian life, and which comprise mixtures of oxygen, a polyatomic gas having a high heat capacity, and helium. These atmospheres are useful in sustaining mammalian life within any closed system wherein a fire hazard would normally be present.

---

This application is a continuation of application Ser. No. 744,314 filed July 12, 1968 now abandoned.

BACKGROUND OF THE INVENTION

1. Field of the Invention

This invention relates to new artificial oxygen-containing atmospheres and more particularly to oxygen-containing atmospheres which will not support combustion but which will sustain mammalian life. An oxygen-containing atmosphere that will sustain mammalian life is one that contains oxygen at a partial pressure sufficient to sustain such life and does not contain gases or vapors more toxic than those classified in Group 6 by Underwriters' Laboratory. Group 6 comprises gases or vapors, which in concentrations up to at least about twenty percent by volume for durations of exposure of the order of two hours, do not appear to produce injury to human beings. An oxygen-containing atmosphere that will not support combustion is one not capable of sustaining the combustion of fuel at ambient temperatures (0–40° C.) when the combustion is solely dependent on the oxygen present in the atmosphere for an oxidizer.

2. Description of the Prior Art

Artificial oxygen-containing atmospheres for closed ecological systems which will support life are known in the prior art. For example, Taylor, U.S. Pat. 3,351,562, describes and claims a process for catalytically decomposing nitrous oxide as a source of nitrogen and oxygen for use in an atmosphere consisting of nitrogen, oxygen, carbon dioxide and water vapor. The Taylor patent recognizes that a fire hazard exists in oxygen-containing atmospheres at Col. 2, line 60 et. seq. No suggestion is made, however, as to how this problem can be overcome.

Extensive testing has been carried out with some perfluoroalkanes and perfluorocycloalkanes to substantiate their physiological inertness. For example, the effect of prolonged exposures to octafluorocyclobutane on such mammals as dogs, rats, rabbits and guinea pigs is reported upon by Clayton, W. J., Delaplane, M. A. and Hood, D. B. in an article entitled "Toxicity Studies with Octafluorocyclobutane" reported at pages 382–8 in the October, 1960 volume of Industrial Hygiene Journal. The experiments reported upon consisted of exposing mammals to atmospheres of air/octafluorocyclobutane and oxygen/octafluorocyclobutane at various proportions and for various periods of time. Octafluorocyclobutane was demonstrated to be a safe propellant for food products by these experiments.

Similar exposures of mammals to perfluoromethane, perfluoroethane and octafluorocyclobutane are reported upon by Clayton, W. J. in an article entitled "Fluorocarbon Toxicity: Past, Present, Future" appearing at pages 333–50 of the May 27, 1967 volume of Journal of the Society of Cosmetic Chemists. These perfluoro compounds were found to be nontoxic.

While the foregoing experiments proved that octafluorocyclobutane is a safe food propellant, and that perfluoromethane, perfluoroethane and octafluorocyclobutane were nontoxic to the mammals tested, the atmospheres used for the tests possess many undesirable physical properties for use in sustaining mammalian life due to their high average molecular weight. For example, a mixture of 10% octafluorocyclobutane/90% air has an average molecular weight of about 45 while a mixture of 80% octafluorocyclobutane/20% oxygen has an average molecular weight of about 166. Air at the earth's surface has an average molecular weight of about 29. Abnormally high molecular weights cause the artificial atmospheres to have physical properties quite different from those to which mammals are accustomed such as increased viscosity, decreased thermal conductivity, increased density, etc. The changed physical properties make many of the mammalian functions such as respiration and sound communication difficult or impossible, and also can cause severe discomfort, such as excessive warmth due to the decreased thermal conductivity of the atmosphere.

Oxygen/helium atmospheres have been prepared and the combustion characteristics of various materials in such atmospheres have been studied. See, for instance, "The Combustibility of Materials in Oxygen-Helium and Oxygen-Nitrogen Atmospheres", SAM-TR–66–85, December 1966. Oxygen/helium atmospheres support combustion, however, and flame-spread rates are even greater in such atmospheres than in oxygen/nitrogen atmospheres like air. Oxygen/helium atmospheres are known to be undesirable for supporting mammalian life because the low average molecular weight of such atmospheres causes, among other things, difficulty in respiration, a feeling of being cold, and sound distortion.

It has also previously been widely accepted that an oxygen-containing atmosphere capable of sustaining mammalian life would also support combustion of a wide variety of fuels.

SUMMARY OF THE INVENTION

An oxygen-containing atmosphere which will not support combustion but which will sustain mammalian life has now been found. This oxygen-containing atmosphere comprises a mixture of:

1. sufficient oxygen to sustain mammalian life;
2. an inert, stable, high-heat capacity polyatomic gas in an amount which provides the oxygen-containing atmosphere with a total heat capacity per mole of oxygen of at least 40 cal./° C. measured at 25° C. and constant pressure; and,
3. helium in an amount of from about 5% to the balance up to 100%.

All percentages given in describing and claiming the atmospheres of this invention are mole percents.

DESCRIPTION OF THE INVENTION

The atmospheres of this invention must contain an amount of oxygen capable of sustaining mammalian life. This amount will depend upon such factors as the particular mammal species involved and the total pressure of the atmosphere. An amount of oxygen which would support human life would certainly be capable of supporting other mammalian life. It is generally believed that an amount of oxygen sufficient to produce an oxygen partial pressure of about 1.8 p.s.i.a. is required to support human life. Lesser amounts result in asphyxiation. On the other hand, amounts of oxygen which produce an oxygen partial pressure above about 8.2 p.s.i.a. are believed to result in oxygen toxicity on prolonged exposure. A preferred amount of oxygen is about 21% at a total pressure of 14.7 p.s.i.a., since this is the amount to which mammals are accustomed. At different total pressures, the amount of oxygen present can be adjusted to fall within the above-mentioned limits.

The oxygen-containing atmospheres of this invention must also contain at least one polyatomic gas which has a high heat capacity. High heat capacities are considered to be anything greater than about 14 calories per mole per degree centigrade measured at 25° C. and constant pressure. To be useful for this invention, the polyatomic gas is also required to be inert and stable. A gas is considered inert if it is (1) nonreactive in the presence of oxygen with standard materials of construction at a temperature of 200° C. and (2) physiologically inert producing no toxic effects on mammalian life processes under the conditions of exposure, i.e. duration and concentration. A gas is considered stable if it will not decompose more than 1% at a temperature of 200° C. over a period of one month.

Preferred polyatomic gases are: $C_1$-$C_6$ perfluoroalkanes such as perfluorobutane, perfluoroethane, perfluorohexane, 2,3-perfluorodimethylbutane and 3-perfluoromethylpentane; perfluorocycloalkanes having 4–6 ring carbon atoms and their perfluoromethyl and perfluoroethyl substituted derivatives having a maximum of 6 carbon atoms such as perfluorocyclobutane, perfluorocyclohexane, perfluorodimethylcyclobutane, perfluoroethylcyclobutane, and perfluoromethylcyclopentane; sulfur hexafluoride, and mixtures of these. Isomers of the perfluoro compounds are included in the groups set out above.

As can be seen, the preferred perfluoro compounds can be cyclic or acyclic. They must be saturated and are limited to a total number of carbon atoms equal to 6 to assure adequate volatility at operating conditions.

Perfluoromethane, perfluoroethane, perfluoropropane, perfluorobutane, perfluorocyclobutane and perfluorodimethylcyclobutane are particularly preferred because they each have excellent thermal stability, inertness, volatility and a high heat capacity.

One method for preparing perfluoroalkanes which are suitable for use with this invention is described in U.S. Pat. 3,167,592. Other methods are well known in the art.

Some of the perfluoro compounds are available from E. I. duPont de Nemours & Co. under the following trademarks:

Perfluoro compound: Trademark
  Perfluoromethane ($CF_4$) _____ Freon–14
  Perfluoroethane ($C_2F_6$) _____ Freon–116
  Perfluorocyclobutane ($C_4F_8$) _____ Freon–C318
  Perfluorodimethylcyclobutane
    ($C_6F_{12}$) _____ Freon–C–51–12

In general, a sufficient amount of the polyatomic gas should be present to provide an atmosphere which will not support combustion. Combustion support depends upon the total heat capacity of the oxygen-containing atmosphere, and these atmospheres will not support combustion if the total heat capacity per mole of oxygen is at least about 40 calories per degree centigrade. All values for heat capacities are determined at 25° C. and constant pressure. The upper limit on the amount of polyatomic gas which can be present is that amount equal to the balance between 100% and the amount of oxygen and helium present. Preferably, sufficient polyatomic gas should be present to provide the atmosphere with a total heat capacity per mole of oxygen of at least 45 calories per degree centigrade to provide an extra margin of safety against combustion support. Amounts of polyatomic gas of 5% to 20% are particularly preferred because such low amounts reduce the overall expense of such atmospheres and provide an atmosphere having a good balance of properties.

The total heat capacity per mole of oxygen can be determined by the formula $$C_p^* = (C_p)_{O_2} + \sum_x \frac{P_x}{P_{O_2}}(C_p)_x$$

wherein:

$C_p^*$=total heat capacity per mole of oxygen at constant pressure;
$P_{O_2}$=partial pressure of oxygen;
$P_x$=partial pressure of other gas;
$(C_p)_x$=heat capacity of other gas at constant pressure.

Helium is added to the atmospheres of this invention because its low molecular weight relative to normal air counterbalances the high molecular weight of the polyatomic gas. Thus, helium is used to reduce the average molecular weight of the oxygen-containing atmospheres to a value nearer to that of normal atmospheric air at the earth's surface thereby facilitating such important functions as respiration, voice and sound transmission, heat tranfer and other such phenomena. Helium is less expensive than polyatomic gases, and the overall cost of the atmosphere is reduced by its use. Additionally, helium is extremely stable and inert.

Helium is used in an amount sufficient to appreciably reduce the overall average molecular weight, which generally requires at least about 5%. Preferably, about 40% helium is present to counterbalance the high molecular weight of the polyatomic compound. A particularly preferred amount of helium is about 69% used with about 21% oxygen and about 10% perfluorocyclobutane because this atmosphere has an average molecular weight very close to that of normal air.

Other inert, stable diluents can be added to the oxygen-containing atmospheres of this invention. Nitrogen is an example of one readily available and suitable diluent.

The oxygen-containing atmospheres of this invention are useful in sustaining mammalian life within a closed system free from fire hazard. For example, such atmospheres can be used in space modules containing mammals for tests carried out either in space or on the earth's surface. Additionally, these atmospheres are useful for medical tests carried out on mammals in hyperbaric chambers where a serious fire hazard has been present in the past. Industrial processes such as welding which can be dangerous when performed within enclosed spaces might also be carried out with a significant reduction or elimination of the fire hazard by using the atmospheres of this invention.

The following examples illustrate the invention.

EXAMPLES 1–8

The test assembly consisted of a five liter glass flask fitted with a stirrer and connected to a vacuum manifold. Fuel samples tested were Whatman No. 1 filter paper strips six mm. wide and approximately 135 mm. long, raw cotton wadding, and rigid polyurethane foam. Each sample was supported in the flask. Exposure to a flame was assured by the use of a paper match ignited by an electrically heated resistance wire. The matchhead was positioned to contact the bottom of the fuel sample which was held in a vertical position.

The following procedure was used. The flask was evacuated to 0.1 mm. Hg. Polyatomic gas and helium were admitted to the flask and stirred. After the flask came to thermal equilibrium (constant pressure), oxygen was admitted to the desired pressure and the system was again stirred and allowed to reach thermal equilibrium. The stirrer was stopped and the ignition system was activated to ignite the matchhead which burned because it contained its own oxidizer. The following results were obtained.

TABLE I

| Example | Composition, percent (mole) | | | Total pressure (mm. Hg) | $C_p^*$ at 25° C. (cal./° C.) | Fuel | Remarks |
|---|---|---|---|---|---|---|---|
| | $O_2$ | Polyatomic | Other | | | | |
| 1 | 21.0 | | 78.0 $N_2$ | 760 | 33 | Filter paper | Atmospheric air. Filter paper burned completely. |
| 2 | 21.1 | 20.0 $C_2F_6$ | 58.9 He | 760 | 45.2 | do | Only matchhead burned. |
| 3 | 21.1 | 20.0 $C_2F_6$ | 58.9 He | 760 | 45.2 | Raw cotton | Do. |
| 4 | 21.1 | 20.0 $C_2F_6$ | 58.9 He | 760 | 45.2 | Rigid foam | Do. |
| 5 | 21.1 | 20.0 $C_2F_6$ | 58.9 He | 760 | 45.2 | None | Do. |
| 6 | 21.1 | 15.0 $C_2F_6$ | 63.9 He | 760 | 40.4 | Filter paper | Paper slightly charred. |
| 7 | 21.0 | 10.0 $C_4F_8$ | 69.0 He | 760 | 43.4 | do | Only matchhead burned. |
| 8 | 21.0 | 5.0 $C_6F_{12}$ | 74.0 He | 600 | 50.1 | do | Do. |

I claim:

1. A habitable atmosphere which does not support combustion and which is capable of sustaining mammalian life comprising:
   a. oxygen in an amount sufficient to sustain mammalian life, said amount providing an oxygen partial pressure within the range of about 1.8 p.s.i.a. and about 8.2 p.s.i.a.;
   b. a perfluoroalkane selected from the group consisting of perfluoromethane, perfluoroethane, perfluoropropane, perfluorobutane, perfluorocyclobutane, perfluorodimethylcyclobutane, and mixtures thereof in an amount sufficient to render said habitable atmosphere substantially incapable of supporting combustion and impart to said atmosphere a total heat capacity per mole of oxygen of at least 40 cal./° C. measured at 25° C. and constant pressure; and
   c. helium in an amount of at least about 5 mole percent.

2. An oxygen-containing atmosphere of claim 1 wherein helium is present in an amount of at least about 40%.

3. An oxygen-containing atmosphere of claim 1 wherein said perfluoroalkane is present in an amount sufficient to provide said oxygen-containing atmosphere with a total heat capacity per mole of oxygen of at least 45 cal./° C. measured at 25° C. and constant pressure.

4. The habitable atmosphere of claim 1 in which the perfluoroalkane is perfluoroethane.

5. The habitable atmosphere of claim 3 in which the perfluoroalkane is perfluoroethane.

6. The habitable atmosphere of claim 1 in which the perfluoroalkane is perfluoropropane.

7. The habitable atmosphere of claim 3 in which the perfluoroalkane is perfluoropropane.

8. The habitable atmosphere of claim 1 in which the amount of oxygen is about 21%.

9. The habitable atmosphere of claim 1 in which the perfluoroalkane is perfluoromethane.

10. The habitable atmosphere of claim 3 in which the perfluoroalkane is perfluoromethane.

11. A process for preventing and controlling fire in an enclosed mammalian-habitable compartment which contains combustible materials, which comprises introducing into said enclosed compartment:
    a. oxygen in an amount sufficient to sustain mammalian life, said amount providing an oxygen partial pressure within the range of about 1.8 p.s.i.a. and about 8.2 p.s.i.a.;
    b. a perfluoroalkane selected from the group consisting of perfluoromethane, perfluoroethane, perfluoropropane, perfluorobutane, perfluorocyclobutane, perfluorodimethylcyclobutane, and mixtures thereof in an amount sufficient to render said habitable atmosphere substantially incapable of supporting combustion and impart to said atmosphere a total heat capacity per mole of oxygen of at least 40 cal./° C. measured at 25° C. and constant pressure; and
    c. helium in an amount of at least about 5 mole percent.

12. The process of claim 11 wherein helium is present in an amount of at least about 40%.

13. The process of claim 11 wherein said perfluoroalkane is present in an amount sufficient to provide said oxygen-containing atmosphere with a total heat capacity per mole of oxygen of at least 45 cal./° C. measured at 25° C. and constant pressure.

14. The process of claim 11 wherein the perfluoroalkane is perfluoroethane.

15. The process of claim 13 wherein the perfluoroalkane is perfluoroethane.

16. The process of claim 11 wherein the perfluoroalkane is perfluoropropane.

17. The process of claim 13 wherein the perfluoroalkane is perfluoropropane.

18. The process of claim 11 wherein the amount of oxygen is about 21%.

19. The process of claim 11 in which the perfluoroalkane is perfluoromethane.

20. The process of claim 13 in which the perfluoroalkane is perfluoromethane.

References Cited

UNITED STATES PATENTS

| 3,676,563 | 7/1972 | Ormand et al. | 424—366 |
| 1,644,363 | 10/1927 | Yant et al. | 424—366 |
| 3,167,592 | 1/1965 | Hauptschein et al. | 252—66 X |
| 3,330,773 | 7/1967 | DeHart | 252—372 |

OTHER REFERENCES

The Merck Index, 7th Edition, p. 1003, 1960.
Chemical Abstracts, vol. 62, p. 5751e, 1965.
Clayton, "Fluorocarbon Toxicity: Past, Present, Future," J. Soc. Cosmetic Chemists, vol. 18, pp. 333–50, 1967.

SAM ROSEN, Primary Examiner

D. J. FUNDERBURK, Assistant Examiner